(12) United States Patent
Jiang et al.

(10) Patent No.: US 8,825,590 B2
(45) Date of Patent: Sep. 2, 2014

(54) SYSTEM AND METHOD FOR TEMPORAL CORRELATION OF OBSERVABLES BASED ON TIMING ASSOCIATED WITH OBSERVATIONS

(71) Applicants: Alexander X. Jiang, Irvine, CA (US); Timothy J. Schroeder, Aliso Viejo, CA (US); Michael Allen Latta, Loveland, CA (US)

(72) Inventors: Alexander X. Jiang, Irvine, CA (US); Timothy J. Schroeder, Aliso Viejo, CA (US); Michael Allen Latta, Loveland, CA (US)

(73) Assignee: Drumright Group, LLC., Healdsburg, CA (US)

( * ) Notice: Subject to any disclaimer, the term of this patent is extended or adjusted under 35 U.S.C. 154(b) by 0 days.

(21) Appl. No.: 13/853,909

(22) Filed: Mar. 29, 2013

(65) Prior Publication Data
US 2013/0238542 A1    Sep. 12, 2013

Related U.S. Application Data

(63) Continuation of application No. 12/793,528, filed on Jun. 3, 2010, now Pat. No. 8,412,663.

(51) Int. Cl.
*G06F 17/00* (2006.01)
*G06N 7/04* (2006.01)
*G06N 5/02* (2006.01)
*G06N 5/04* (2006.01)

(52) U.S. Cl.
CPC ... *G06N 5/02* (2013.01); *G06N 5/04* (2013.01)
USPC .......................................................... 706/54

(58) Field of Classification Search
CPC ................................ G06N 5/04; G04G 15/003
See application file for complete search history.

(56) References Cited

U.S. PATENT DOCUMENTS

| 7,248,172 | B2 | 7/2007 | Clifford et al. | |
| 7,512,624 | B2 | 3/2009 | Ankerst | |
| 7,917,376 | B2 | 3/2011 | Bellin et al. | |
| 2006/0028550 | A1 | 2/2006 | Palmer, Jr. et al. | |
| 2007/0067403 | A1* | 3/2007 | Holmes | 709/206 |
| 2009/0009393 | A1 | 1/2009 | Tillotson et al. | |
| 2009/0248900 | A1 | 10/2009 | Marucheck et al. | |
| 2011/0302129 | A1 | 12/2011 | Jiang et al. | |

FOREIGN PATENT DOCUMENTS

WO    WO 2011152911    12/2011

OTHER PUBLICATIONS

Patel et al. "Mining Relationships Among Interval-based Events for Classification", SIGMOD, 2008, pp. 393-404.*
Kam et al. "Discovering Temporal Patterns for Interval-based Events", LNCS 1874, (Eds) DaWak, 2000, pp. 317-326.*

(Continued)

*Primary Examiner* — Li-Wu Chang
(74) *Attorney, Agent, or Firm* — Blakely, Sokoloff, Taylor & Zafman LLP

(57) ABSTRACT

According to one embodiment, an electronic device may be configured to perform temporal correlation operations to determine if a plurality of observables correspond to an event of interest. The electronic device comprises a memory and a processor. The memory is adapted to store information representing a process template for the event, where the process template including a plurality of observation states. The processor is coupled to the memory. The processor is adapted to receive a plurality of observables, even in non-chronological order, and to conduct a recursive comparison of time values associated with each of the plurality of observables to timing ranges associated with each observation state to determine if the plurality of observables are associated with the event.

15 Claims, 15 Drawing Sheets

(56) References Cited

OTHER PUBLICATIONS

U.S. Appl. No. 12/793,528 Non-Final Office Action, mailed Oct. 15, 2012.

PCT International Search Report and Written Opinion, International Application No. PCT/US2011/027999, mailed Mar. 10, 2011.

Patel et al. "Mining Relationships Among Interval-based Events for Classification," SIGMOD, 2008, pp. 393-404.

* cited by examiner

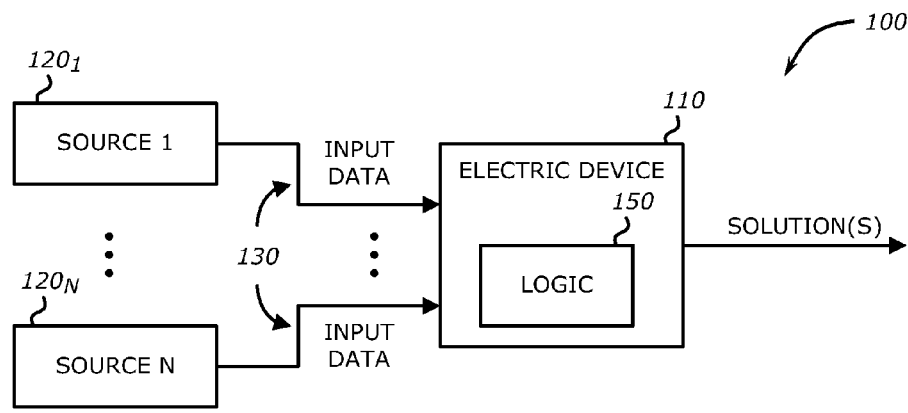
FIG. 1
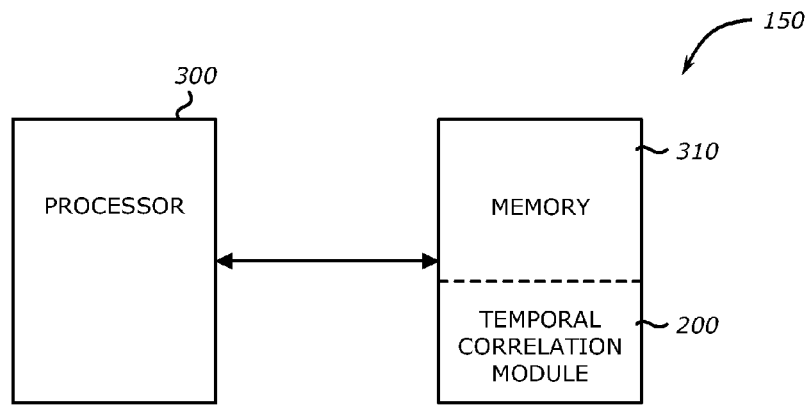
FIG. 3A
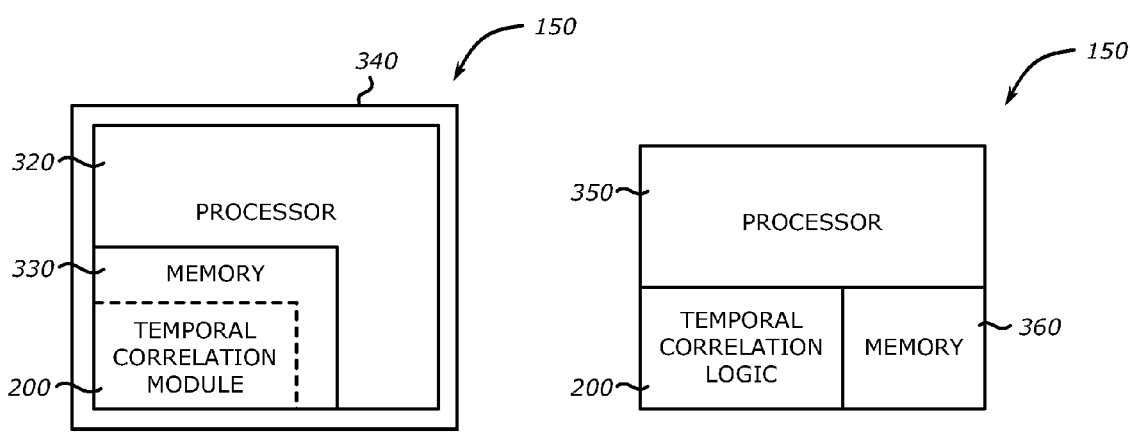
FIG. 3B
FIG. 3C

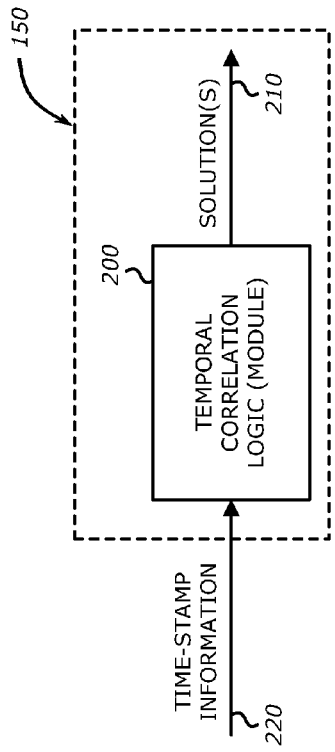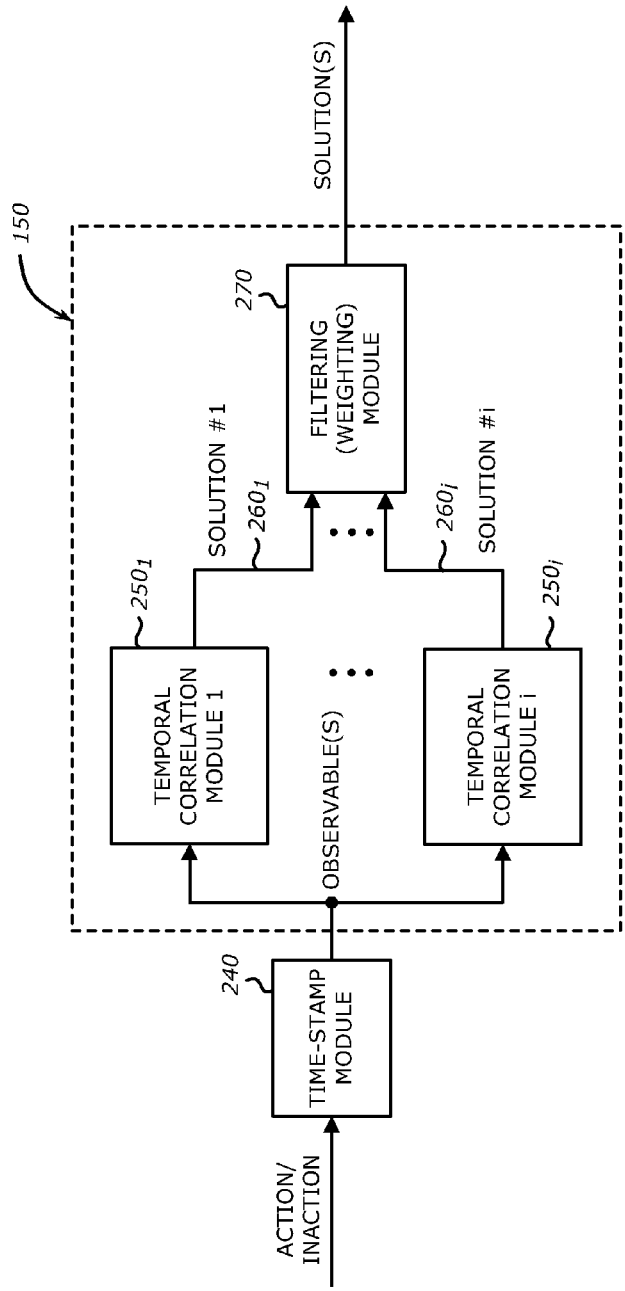

| OCCURENCE | OBSERVATION TIME (t) |
|---|---|
| d1 | 1 |
| c1 | 2 |
| h1 | 5 |
| a1 | 6 |
| h2 | 11 |
| g1 | 12 |
| d2 | 12 |
| f1 | 14 |
| g2 | 16 |
| e1 | 20 |
| a2 | 26 |
| f2 | 26 |
| e2 | 26 |
| b1 | 26 |
| d3 | 27 |

Solution #1:
Anchor: Occ 'a2' (2009-01-02 02:00:00)
Matched Observables: [Occ 'a2' (2009-01-02 02:00:00), Occ 'b1' (2009-01-02 02:00:00)]
Matched Vertices (Verbose): [Step A (minDur=1:00:00, maxDur=5:00:00), Step B (minDur=2:00:00, maxDur=6:00:00)]
Matched Vertices (Brief): [A, B]

FIG. 7C

Solution #2:
Anchor: Occ 'a1' (2009-01-01 06:00:00)
Matched Observables: [Occ 'f2' (2009-01-02 02:00:00), Occ 'd2' (2009-01-01 12:00:00), Occ 'f1' (2009-01-01 14:00:00), Occ 'a1' (2009-01-01 06:00:00), Occ 'g1' (2009-01-01 12:00:00), Occ 'g2' (2009-01-01 16:00:00)]
Matched Vertices (Verbose): [Step D (minDur=3:00:00, maxDur=7:00:00), Step G (minDur=1:00:00, maxDur=2:00:00), Step F (minDur=4:00:00, maxDur=8:00:00), Step A (minDur=1:00:00, maxDur=5:00:00)]
Matched Vertices (Brief): [D, G, F, A]

FIG. 7D

Solution #3:
Anchor: Occ 'b1' (2009-01-02 02:00:00)
Matched Observables: [Occ 'b1' (2009-01-02 02:00:00), Occ 'd3' (2009-01-02 03:00:00), Occ 'e2' (2009-01-02 02:00:00)]
Matched Vertices (Verbose): [Step D (minDur=3:00:00, maxDur=7:00:00), Step E (minDur=10:00:00, maxDur=20:00:00), Step B (minDur=2:00:00, maxDur=6:00:00)]
Matched Vertices (Brief): [D, E, B]

FIG. 7E

Solution #4:
Anchor: Occ 'c1' (2009-01-01 02:00:00)
Matched Observables: [Occ 'f2' (2009-01-02 02:00:00), Occ 'd2' (2009-01-01 12:00:00), Occ 'g1' (2009-01-01 12:00:00), Occ 'g2' (2009-01-01 16:00:00), Occ 'c1' (2009-01-01 02:00:00)]
Matched Vertices (Verbose): [Step D (minDur=3:00:00, maxDur=7:00:00), Step G (minDur=1:00:00, maxDur=2:00:00), Step F (minDur=4:00:00, maxDur=8:00:00), Step C (minDur=5:00:00, maxDur=6:00:00)]
Matched Vertices (Brief): [D, G, F, C]

FIG. 7F

Solution #5:
Anchor: Occ 'd1' (2009-01-01 01:00:00)
Matched Observables: [Occ 'd1' (2009-01-01 01:00:00), Occ 'f1' (2009-01-01 14:00:00)]
Matched Vertices (Verbose): [Step D (minDur=3:00:00, maxDur=7:00:00), Step F (minDur=4:00:00, maxDur=8:00:00)]
Matched Vertices (Brief): [D, F]

FIG. 7G

Solution #6:
Anchor: Occ 'd2' (2009-01-01 12:00:00)
Matched Observables: [Occ 'd2' (2009-01-01 12:00:00), Occ 'f2' (2009-01-02 02:00:00), Occ 'd3' (2009-01-01 06:00:00), Occ 'g1' (2009-01-01 12:00:00), Occ 'g2' (2009-01-01 16:00:00)]
Matched Vertices (Verbose): [Step D (minDur=3:00:00, maxDur=7:00:00), Step G (minDur=1:00:00, maxDur=2:00:00), Step A (minDur=1:00:00, maxDur=5:00:00), Step F (minDur=4:00:00, maxDur=8:00:00)]
Matched Vertices (Brief): [D, G, A, F]

FIG. 7H

Solution #7:
Anchor: Occ 'd3' (2009-01-02 03:00:00)
Matched Observables: [Occ 'e1' (2009-01-01 20:00:00), Occ 'a1' (2009-01-01 06:00:00), Occ 'd3' (2009-01-02 03:00:00), Occ 'c2' (2009-01-02 02:00:00)]
Matched Vertices (Verbose): [Step D (minDur=3:00:00, maxDur=7:00:00), Step E (minDur=10:00:00, maxDur=20:00:00), Step A (minDur=1:00:00, maxDur=5:00:00)]
Matched Vertices (Brief): [D, E, A]

FIG. 7I

Solution #8:
Anchor: Occ 'e1' (2009-01-01 20:00:00)
Matched Observables: [Occ 'e1' (2009-01-01 20:00:00), Occ 'a1' (2009-01-01 06:00:00), Occ 'd3' (2009-01-02 03:00:00)]
Matched Vertices (Verbose): [Step D (minDur=3:00:00, maxDur=7:00:00), Step A (minDur=1:00:00, maxDur=5:00:00), Step E (minDur=10:00:00, maxDur=20:00:00)]
Matched Vertices (Brief): [D, A, E]

FIG. 7J

Solution #9:
Anchor: Occ 'e2' (2009-01-02 02:00:00)
Matched Observables: [Occ 'a1' (2009-01-01 06:00:00), Occ 'e2' (2009-01-02 02:00:00)]
Matched Vertices (Verbose): [Step D (minDur=3:00:00, maxDur=7:00:00), Step A (minDur=1:00:00, maxDur=5:00:00), Step E (minDur=10:00:00, maxDur=20:00:00)]
Matched Vertices (Brief): [D, A, E]

FIG. 7K

Solution #10:
Anchor: Occ 'f2' (2009-01-02 02:00:00)
Matched Observables: [Occ 'f2' (2009-01-02 02:00:00), Occ 'd3' (2009-01-02 03:00:00), Occ 'd2' (2009-01-02 02:00:00), Occ 'f2' (2009-01-01 12:00:00), Occ 'a1' (2009-01-01 06:00:00), Occ 'g1' (2009-01-01 12:00:00), Occ 'g2' (2009-01-01 16:00:00)]
Matched Vertices (Verbose): [Step D (minDur=3:00:00, maxDur=7:00:00), Step G (minDur=1:00:00, maxDur=2:00:00), Step A (minDur=1:00:00, maxDur=5:00:00), Step F (minDur=4:00:00, maxDur=8:00:00)]
Matched Vertices (Brief): [D, G, A, F]

FIG. 7L

Solution #11:
Anchor: Occ 'f1' (2009-01-01 14:00:00)
Matched Observables: [Occ 'd1' (2009-01-01 01:00:00), Occ 'd2' (2009-01-01 12:00:00), Occ 'f1' (2009-01-01 14:00:00)]
Matched Vertices (Verbose): [Step D (minDur=3:00:00, maxDur=7:00:00), Step F (minDur=4:00:00, maxDur=8:00:00)]
Matched Vertices (Brief): [D, F]

FIG. 7M

Solution #12:
Anchor: Occ 'g1' (2009-01-01 12:00:00)
Matched Observables: [Occ 'f2' (2009-01-02 02:00:00), Occ 'd2' (2009-01-01 12:00:00), Occ 'g1' (2009-01-01 12:00:00), Occ 'f1' (2009-01-01 14:00:00), Occ 'a1' (2009-01-01 06:00:00), Occ 'g1' (2009-01-01 12:00:00)]
Matched Vertices (Verbose): [Step D (minDur=3:00:00, maxDur=7:00:00), Step G (minDur=1:00:00, maxDur=2:00:00), Step A (minDur=1:00:00, maxDur=5:00:00), Step F (minDur=4:00:00, maxDur=8:00:00)]
Matched Vertices (Brief): [D, G, A, F]

FIG. 7N

Solution #13:
Anchor: Occ 'g2' (2009-01-01 16:00:00)
Matched Observables: [Occ 'f2' (2009-01-02 02:00:00), Occ 'd2' (2009-01-01 12:00:00), Occ 'f1' (2009-01-01 14:00:00), Occ 'a1' (2009-01-01 06:00:00), Occ 'g2' (2009-01-01 16:00:00)]
Matched Vertices (Verbose): [Step D (minDur=3:00:00, maxDur=7:00:00), Step G (minDur=1:00:00, maxDur=2:00:00), Step A (minDur=1:00:00, maxDur=5:00:00), Step F (minDur=4:00:00, maxDur=8:00:00)]
Matched Vertices (Brief): [D, G, A, F]

*FIG. 7O*

Solution #14:
Anchor: Occ 'h1' (2009-01-01 11:00:00)
Matched Observables: [Occ 'h1' (2009-01-01 11:00:00)]
Matched Vertices (Verbose): [Step H (minDur=3:00:00, maxDur=4:00:00)]
Matched Vertices (Brief): [H]

*FIG. 7P*

Solution #15:
Anchor: Occ 'h2' (2009-01-01 05:00:00)
Matched Observables: [Occ 'h2' (2009-01-01 05:00:00)]
Matched Vertices (Verbose): [Step H (minDur=3:00:00, maxDur=4:00:00)]
Matched Vertices (Brief): [H]
-- end --

*FIG. 7Q*

SYSTEM AND METHOD FOR TEMPORAL CORRELATION OF OBSERVABLES BASED ON TIMING ASSOCIATED WITH OBSERVATIONS

CROSS-REFERENCE TO RELATED APPLICATIONS

This application is a continuation application that is based upon and claims the benefit of priority to U.S. application Ser. No. 12/793,528, now U.S. Pat. No. 8,412,663, the entire contents of which are incorporated herein by reference.

FIELD

Embodiments of the invention relate to a time-based mechanism that compares observables with known process templates. More specifically, one embodiment of the invention relates to an executable process and its corresponding method of operation in supporting recursive processing of observables in an attempt to match some or all of these observables to a monitored process.

BACKGROUND

As the security of governments, businesses, organizations and individuals is increasingly threatened by various individuals and groups, it has become increasingly important to be able to timely and effectively process information that may be useful in detecting and preventing future threats as well as responding to threats that are in the development stage. Unfortunately, conventional procedures for processing such critical information are largely ineffective because they are based on labor-intensive, manual processes. For instance, conventional procedures may feature a person analyzing information that is provided from multiple sources and provided in a variety of formats such as written (e.g., letters, memoranda, reports, etc.) or auditory (e.g., taped conversations, monitored person-to-person telephone calls, etc.). Such manual procedures are more likely to fail in responding to threats, especially in situations where data is provided without any chronological order in receipt.

Hence, it is desirable that an automated, reliable system for such processing and threat detection.

BRIEF DESCRIPTION OF THE DRAWINGS

Embodiments of the invention may best be understood by referring to the following description and accompanying drawings that are used to illustrate embodiments of the invention.

FIG. 1 is an exemplary diagram of a system featuring multiple input sources and comprising logic deployed as part of an electronic device that performs temporal correlation operations.

FIG. 2A is an exemplary embodiment of a temporal correlation logic (module) adapted to produce one or more solutions based on temporal correlation operations conducted for observables.

FIG. 2B is an exemplary embodiment of a temporal correlation logic having a multi-level hierarchy of which multiple temporal correlation logic elements are adapted to output solutions that are optionally weighted to produce the resultant solution(s).

FIG. 3A is an exemplary embodiment of a temporal correlation module stored within memory external to a processor and executed by the processor.

FIG. 3B is an exemplary embodiment of a temporal correlation module deployed within internal memory of the processor and executed by the processor.

FIG. 3C is an exemplary embodiment of temporal correlation logic deployed within the processor itself.

FIGS. 7C-7Q illustrate computed solutions for a set of observables listed in an occurrence table of FIG. 7B.

DETAILED DESCRIPTION

Figure 4:
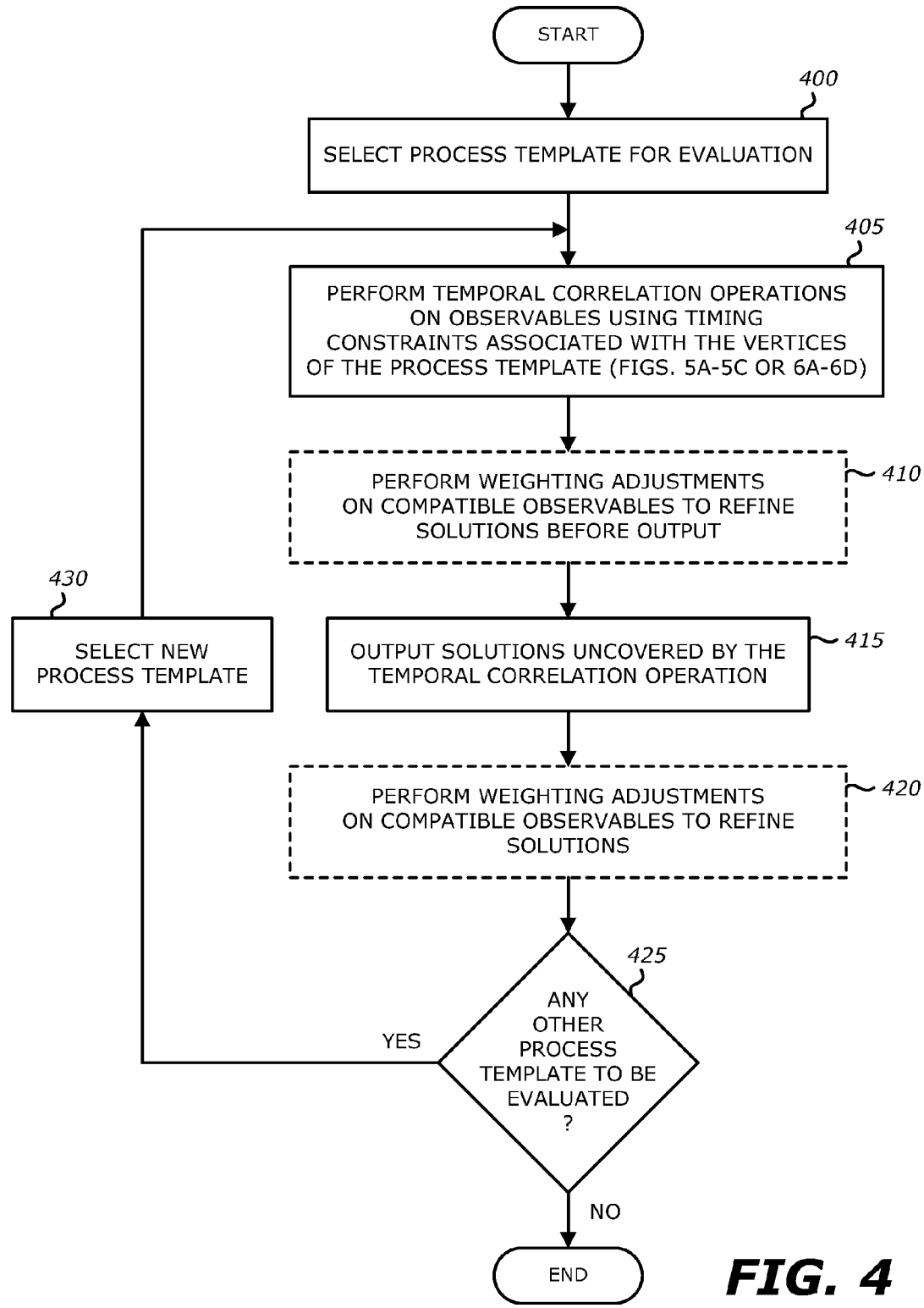
FIG. 4 is an exemplary embodiment of a flowchart illustrating the temporal correlation operations to support the processing of observables.

Herein, for the purposes of explanation, numerous specific details are set forth in order to provide a thorough understanding of the invention. It will be apparent; however, to one skilled in the art that the invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. Also, in some instances, well-known structures and devices are not shown in block diagram form in order to avoid obscuring the details of the disclosed features of various described embodiments.

In the following description, certain terminology is used to describe certain features of the invention. For instance, the term "communication link" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology). Also, the term "electronic device" is generally defined as any device that features components which perform data comparison such as the comparison of observables to established observation states within a selected process template for example. Examples of electronic devices include, but are not limited or restricted to a computer (e.g., server, mainframe, desktop, etc.), security equipment, a portable device (e.g., laptop, netbook, portable tablet, cellular phone, personal digital assistant "PDA," etc.), an embedded special purpose integrated circuit, or the like.

Both terms "logic" and "module" are generally defined as hardware, software, firmware or any combination thereof that is configured to process input information from one or more sources. Various examples may include, but are not limited to a processor, a programmable circuit, combinatorial, an application specific integrated circuit (ASIC), software, and the like. The input information may include text, image(s), video, audio, or any combination thereof. The input information may be sent from the same or different sources either in a structured format (e.g., report) or in an unstructured format (e.g., loose without any accompanying information).

"Software" is generally describes as a series of executable instructions in the form of an application, an applet, a routine, or even a sub-routine. For instance, a software module may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., Universal Serial Bus "USB" drive, optical disc, digital tape), or the like.

A glossary of the terms associated with the functionality of the logic that supports the temporal correlation processing to determine those observables that are compatible with vertices of a monitored process template is listed below:

1) Observable: an activity defined in time that may have significance to a predetermined process template being monitored. Examples of the activity may include an action or inaction performed by an entity being monitored such as purchasing some items, visiting or missing from a location or the like;
2) Anchor vertex: a state in a process template corresponding to a selected observable from which temporal comparisons with other observables are conducted;
3) Compatible: a determination that the observed timing of an observable is consistent with the timing range set for the anchor vertex of the monitored process along with, where applicable, the timing range set for one or more intermediary vertices between the anchor vertex and the vertex corresponding to the observable;
4) Successor observable: an observable that occurs temporally after the selected observable that is used as the anchor vertex for a given analysis;
5) Predecessor observable: an observable that occurs temporally before the selected observable that is used as the anchor vertex for a given analysis; and
6) Process template: a predetermined series of observation states (vertices) that correspond to a set of observables where each state (vertex) has predefined timing constraints that are used in determining compatible successor and predecessor observables.

Referring to FIG. 1, an exemplary diagram of a system 100 that comprises logic 150 deployed as part of an electronic device 110 is shown. Herein, logic 150 receives input data that includes observables. These observables may arrive out-of-order, namely in an order different from the order of observation. After receipt, logic 150 performs temporal comparisons between each of these observables and time-based parameters associated with an observation state corresponding to that observable. The process template includes observation states that collectively represent an event of interest to be monitored. This event of interest may include, but is not limited or restricted to a security breach, an unlawful event, a potential threat to the public at large, or the like. Therefore, the more observables that match observation states of a process template, the more likely that the observables involve the event of interest represented by the process template.

According to this embodiment of the invention, system 100 includes one or more sources $120_1$-$120_N$ ($N \geq 1$), which are used to collect and transmit information to electronic device 110. Each source $120_1, \ldots, 120_N$ transmits information that is processed as an observable by logic 150. According to one embodiment of the invention, this information processed as an observable by logic 150 includes data representing an activity being monitored and a time value identifying when the activity was observed. The data may be a prescribed code, a text description, or other identifiers that can be used by system 100 to represent that an activity was observed. The time value may be an actual time of observable (e.g. any granularity from year to year, month, day, hour, minute or second) or a count value that is adapted to provide chronological information given an incrementing and decrementing count value. For both of these embodiments, the sources should be synchronized.

It is contemplated that information being processed as an observable, which corresponds to an activity being monitored by one or more sources $120_1, \ldots,$ or $120_N$, may be received in a non-chronological manner with respect to other observables associated with the event. The non-chronological receipt of the observables may be due to a variety of reasons including, but not limited or restricted to the particular methods and sources of collection used at each source, transmission delays, or the like.

Time-based compatibility is predicated on determining whether an observable occurred within a timing range assigned to an observation state associated with that observable within the monitored process template. As an example, a process template is formulated with multiple observation states. For instance, observation state (vertex) A and preceding vertex B are each assigned maximum and minimum durations. The "maxDuration" and "minDuration" are units of time that represent a length of time that the activity associated with the observation state will need to complete. These units of time are preset for the process template and stored for subsequent access when logic 150 conducts a temporal correlation operation to determine which observables are compatible given a selected anchor vertex.

Herein, the time ($t_a$) is recorded by the observing source (e.g., sources $120_1$) and sent as a parameter of observable "a". Based on an observable "a" and the time that the observation was made ($t_a$), the earliest and latest possible times that an observable associated with observation state B can occur may be computed for each possible path "p" from A to B. The earliest possible time for observable "b" is ($t_a$+ΣminDuration for all vertices of the selected path "p"). The latest possible time for an observable "b" is ($t_a$+ΣmaxDuration for all vertices of the selected path "p"). As a result, these points of time can be used to determine which successor or predecessor observables are considered to be compatible with a neighboring observation state, where all of which are compatible with the selected anchor vertex.

According to another embodiment of the invention, the time when the observation was made ($t_a'$) at the electronic device is stored for use in determining the earliest ($t_a'$+minDuration-at-device) and latest ($t_a'$+maxDuration-at-device) times for this observable in order to determine temporal compatibility with an observation state (anchor vertex) of a particular process template. The parameters "maxDuration-at-device" and "minDuration-at-device" are units of time that represent durations for the selected observable to occur starting from receipt at electronic device 110.

According to both of these embodiments of the invention, sources $120_1$-$120_N$ may be one or more computers or security cameras are in communication with electronic device 110 over one or more communication links 130 coupled directly or indirectly to one or more inputs (e.g., ports, jacks, wireless receivers, etc.) of electronic device 110. As an alternative embodiment, sources $120_1$-$120_N$ may include one or more handheld devices (e.g., cellular telephones, scanners, etc.) that are in communication with electronic device 110 over communication links 130. Communication links 130 may be adapted as part of a public network, but alternatively, may be configured to support a private network configuration or peer-to-peer communications in providing direct feeds of information to electronic device 110. As yet another alternative, although not shown, at least one of sources $120_1$-$120_N$ may be directly attached to or part of electronic device 110.

Referring to FIG. 2A, a first exemplary embodiment of logic 150 of FIG. 1 is shown. According to this embodiment of the invention, logic 150 at least partially comprises a temporal correlation logic 200 that is adapted to output one or more solutions 210 in response to detecting matches between observation states associated with a given process template and observables from a set of observables. In particular, temporal correlation logic 200 performs temporal correlation operations on incoming time-stamped information 220, which includes observables that comprise data potentially representing an activity being monitored and a time value identifying when the activity was observed.

For instance, temporal correlation logic 200 determines if a portion of the information (e.g., an observable) is compatible with one or more observation states of the process template. When the observable is determined to be compatible with an observation state (e.g., the timing of the observable corresponding to an observation state of the monitored process is within a timing range established by the observation state corresponding to the observable and the anchor vertex), temporal correlation logic 200 stores at least the observation state as part of the solution. These temporal correlation operations are performed in an iterative (recursive) manner on the observables as described below.

More specifically, according to one embodiment of the invention, temporal correlation operations may be performed in accordance with at least two techniques listed below. For instance, initially, an observable is selected from a set of observables. Thereafter, a first observation state within the process template, which corresponds to the selected observable, is set as the anchor vertex and temporal correlation logic 200 checks the remaining observables within the set of observables, including both successor and predecessor observables, to determine if any of these observables is compatible with the anchor vertex. If so, a second observation state within the process template, which corresponds to this compatible observable, is now set to be the anchor vertex.

Thereafter, temporal correlation logic 200 checks all of the remaining observables (excluding the observable initially assigned to be the anchor vertex) to determine if there are any observables that are compatible with the newly assigned anchor vertex. Once there are no compatible observables associated with the anchor vertex, the anchor vertex is set to an observation state corresponding to an observable that has not already been selected as an anchor vertex.

Figures 7A, 7B:
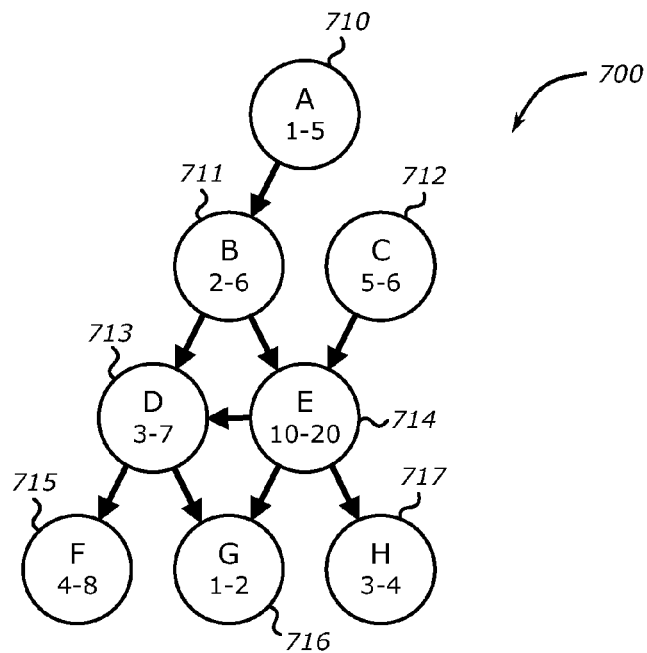
FIG. 7A illustrates an exemplary process template for processing successor and predecessor observables
FIG. 7B illustrates an exemplary occurrence table to store information associated with the successor and predecessor observables.

Hence, the temporal correlation operations are performed in a recursive manner until all of the observables within the set of observables have been set as an anchor vertex. An exemplary embodiment of this recursive process is illustrated in FIGS. 7A-7Q below.

According to another embodiment of the temporal correlation operations, an observable is selected from a set of observables. Thereafter, a first observation state within the process template, which corresponds to the selected observable, is set as the anchor vertex and temporal correlation logic 200 checks the remaining observables within the set of observables to determine if any of these observables are compatible with the anchor vertex (e.g., consistent temporally with the anchor vertex). If so, all of the compatible observables are stored as part of a compatibility listing. Next, an observation state within the process template, which corresponds to the one of the stored compatible observables in the listing, is now set to be the new anchor vertex.

Thereafter, temporal correlation logic 200 checks all of the remaining observables (excluding the stored compatible observables) to determine if there are any observables that are compatible with an observation state neighboring the new anchor vertex. If so, any newly uncovered compatible observables are stored as part of the compatibility listing until no further compatible observables are detected. Thereafter, once there are no compatible observables associated with the anchor vertex, temporal correlation logic 200 selects an observation state within the process template, which corresponds to another stored observable in the listing, and now sets this stored observable as the new anchor vertex. The process continues until all observation states within the process template, corresponding to each of the stored observables in the compatibility listing, have been set as the anchor vertex.

Referring now to FIG. 2B, a second exemplary embodiment of logic 150 of FIG. 1 is shown, where logic 150 is being implemented as a multi-level logic featuring multiple temporal correlation modules. More specifically, logic 150 comprises a plurality of temporal correlation modules $250_1$-$250_I$ (I≥2) that collectively operate as temporal correlation logic 200 in FIG. 2A. According to this embodiment of the invention, temporal correlation modules $250_1$-$250_I$(I≥2) are adapted to generate respective solutions $260_1$-$260_I$ in response to performing temporal correlation operations between a set of observables and one or more process templates supported by the module. For instance, temporal correlation module $250_1$ receives incoming observables, namely observed actions (and/or inactions) that are time-stamped by a time-stamping module 240 at source $120_1$ of FIG. 1 to denote a time of observation or at electronic device 110 if time-stamping substantially occurs in real-time from the point of observation.

Thereafter, temporal correlation module $250_1$ determines which of the observables, if any, is compatible with a process template being analyzed by temporal correlation module $250_1$. Temporal correlation modules $250_2$-$250_I$ may perform similar operations using the same process template for redundancy or using different process templates for parallel processing. Solutions $260_1$-$260_I$ may be transmitted to a second set of temporal correlation modules (not shown) that perform the same temporal correlation operations as described above. Alternatively, as shown, solutions $260_1$-$260_I$ may be provided to a filtering (weighting) module 270 that accounts for weighting more heavily to certain observables that are determined to be compatible with specific observation states.

Referring to FIG. 3A, a first exemplary embodiment of the general architecture of logic 150 is shown. Herein, according to this embodiment of the invention, logic 150 comprises hardware logic such as a processor 300 in communication with a memory 310 that is contained within electronic device 110 of FIG. 1. Being non-volatile, memory 310 stores at least temporal correlation module 200. Temporal correlation module 200 is software that is preloaded into memory 310 at manufacture or may be downloaded from an external storage device (not shown) by the original equipment manufacturer (OEM) of electronic device 110 or by the user.

Referring now to FIG. 3B, a second exemplary embodiment of the general architecture of logic 150 is shown. Herein, according to this embodiment of the invention, logic 150 comprises hardware logic such as a processor 320 with internal memory 330 that are both housed within the same semiconductor package 340. Being non-volatile, memory 330 stores at least one temporal correlation module 200. Similarly, temporal correlation module 200 is software that is preloaded into internal memory 330 at manufacture or may be uploaded into internal memory 330 subsequently such as during set-up of the electronic device featuring processor 320. Processor 320 executes temporal correlation module 200 to perform the temporal correlation operations described herein. The resultant solutions as well as the observables may be at least partially stored within memory 330.

Referring now to FIG. 3C, a third exemplary embodiment of the general architecture of logic 150 is shown. Herein, according to this embodiment of the invention, logic 150 comprises a processor 350 with internal memory 360 and temporal correlation logic 200. For this embodiment, temporal correlation logic 200 is hardware implemented within a packaged product that features processor 350. For instance, temporal correlation logic 200 may be hardware that is formed as part of the integrated circuit forming processor 350 or as an integrated circuit that is packaged with processor 350. Hence, temporal correlation logic 200 performs the temporal correlation operations and stores the resultant solutions in memory 360. Examples of temporal correlation logic 200 may include, but is not limited or restricted to programmable logic, combinatorial logic, or the like. Of course, it is contemplated that temporal correlation logic 200 may be implemented as a component separate from processor 350.

FIG. 4 is an exemplary embodiment of a flowchart illustrating the temporal correlation operations by logic 150 to support the processing of observables to determine if a noted event of interest may have been performed. First, a process template is selected for evaluation (block 400). The process template represents an event of interest that, based on the observables, is analyzed to determine if it has or has not occurred. Next, temporal correlation operations are performed on a set of observables using timing constraints associated with the vertices (observation states) of the process template (block 405). These temporal correlation operations are generally described above and described in more detail in FIGS. 5A-5C and 6A-6D.

Herein, the temporal correlation operations produce solutions that can be subsequently analyzed to determine if the event associated with the process template likely occurred (block 415). According to one embodiment of the invention, the number of solutions generated corresponds to the number of observables forming the set of observables. The reason is because, for each solution, a different observable is selected as the anchor vertex. Herein, each solution may include, but is not limited or restricted to one or more of the following: (1) a listing of the observable considered to be the "anchor vertex"; (2) a listing of those observables from a set of observables that are deemed to be compatible with an observation state for a given process template; and (3) a listing of the observation states (vertices) that are matched by the compatible observables. An exemplary embodiment of the content of the solution is set forth in FIGS. 7C-7Q.

As optional features, it is contemplated that temporal correlation operations may perform weighting adjustments on compatible observables to refine the solutions before or after being output (blocks 410 or 420). This weighting may be used to highlight a solution that is more pertinent for subsequent analysis than other solutions.

Therefore, a determination is made whether there are any other process templates to be evaluated (block 425). If so, a new process template is selected and the temporal correlation operations are performed on the set of observables (block 430). If not, the operations are discontinued and the solutions can be evaluated.

Figure 5A:
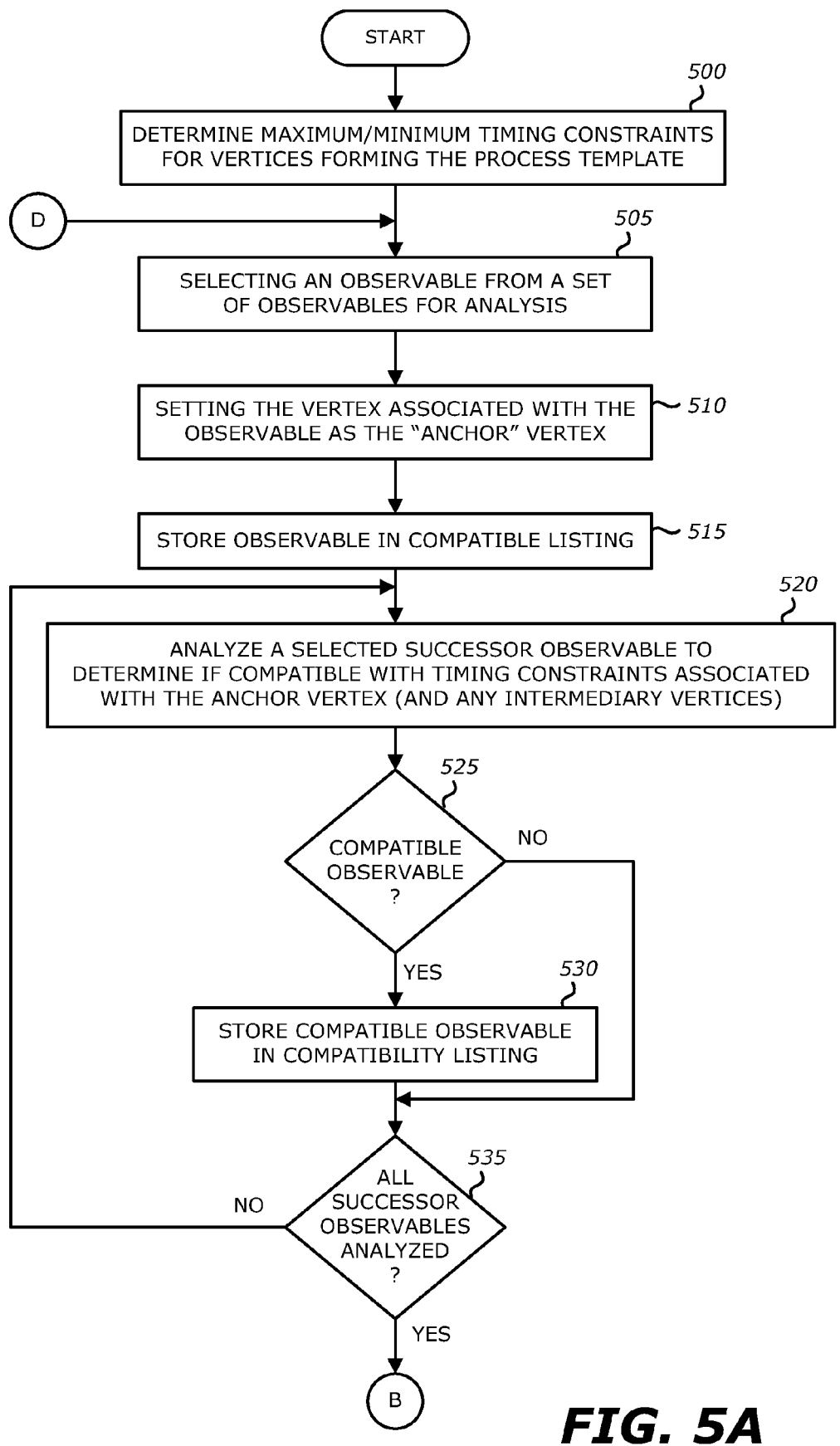
FIGS. 5A-5C is a first illustrative embodiment of the temporal correlation operations performed by temporal correlation logic residing in the electronic device of FIG. 1.
Figure 5B:
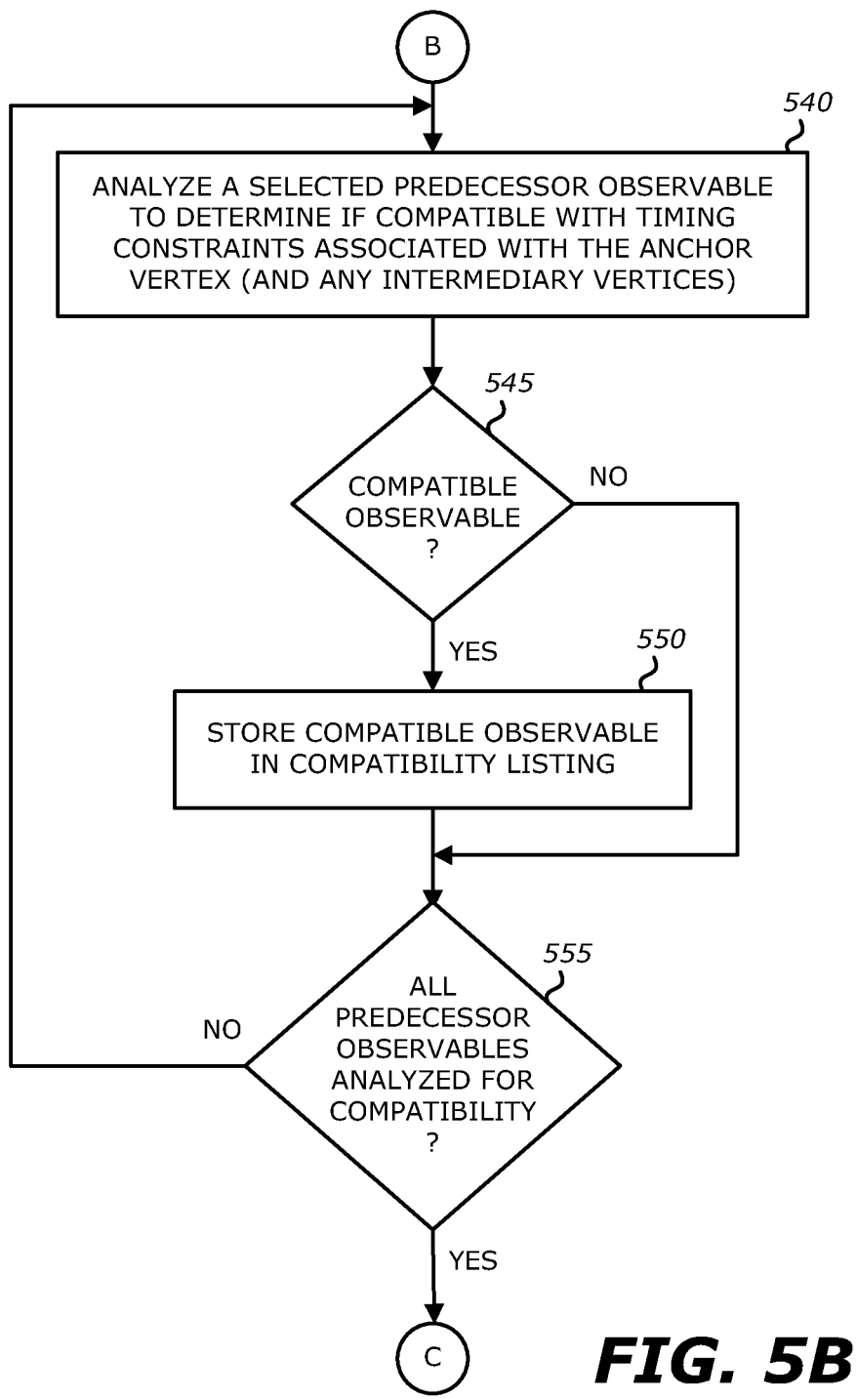
Figure 5C:
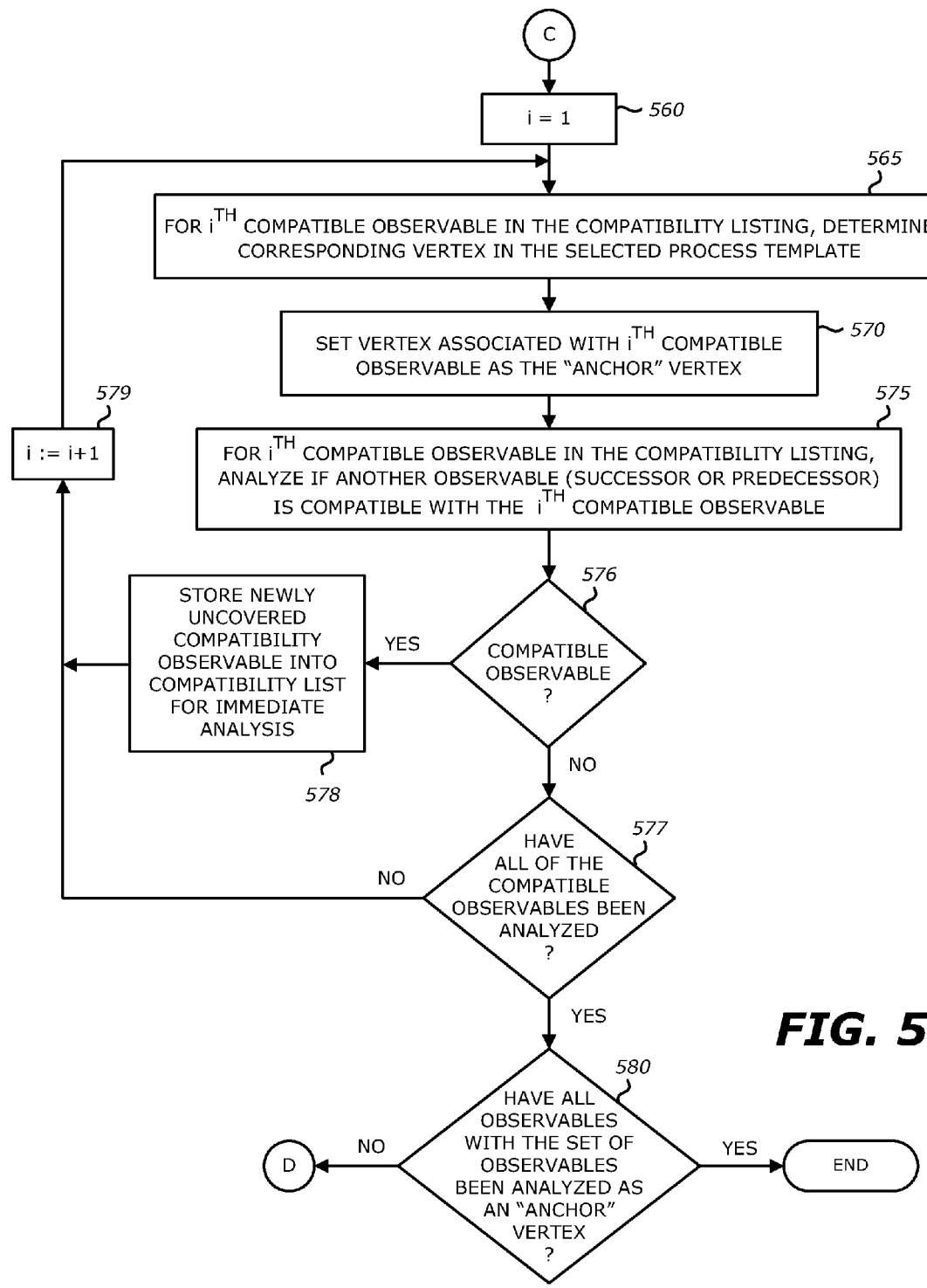

Referring to FIGS. 5A-5C, a first illustrative embodiment of the temporal correlation operations performed by temporal correlation logic residing in electronic device 110 of FIG. 1 is shown. Initially, minimum and maximum timing constraints for each of the vertices forming the process template are determined (block 500) as shown in FIG. 5A. The timing constraints may be stored for subsequent access during temporal correlation processing.

An observable from a set of observables is selected for analysis (block 505). The set of observables is information received from one or more sources that is based on reported, time-based observables. The selected observable is set to be the "anchor vertex," and the observable is stored in a listing of compatible observables. This listing generally represents those observables that are a portion of a monitored process (blocks 510 and 515).

Thereafter, a successor observable is selected and analyzed to determine if the successor observable is compatible with the anchor vertex and any intermediary vertices (blocks 520 and 525). As described, the observable is "compatible" if its observed time falls within a timing range formulated by the timing range of the anchor vertex and any intermediary vertices between the anchor vertex and the vertex corresponding to the observable. If not, another successor observable is selected and the analysis continues (block 535). However, if the successor observable is compatible with the anchor vertex, it is stored within the listing of compatible observables and another successor observable is selected unless there are no further successor observables left (blocks 530 and 535).

After the successor observables have been analyzed, the temporal correction operations involves an analysis of a selected predecessor observable to determine if it is compatible with timing constraints associated with the anchor vertex and any intermediary vertices as shown in FIG. 5B (blocks 540 and 545). If the predecessor observable is compatible with the anchor vertex, the predecessor observable is loaded into the listing of compatible observables, and thereafter, the analysis continues with another selected predecessor observable until all of the predecessor observables have been analyzed (blocks 550 and 555). However, if the predecessor observable is not compatible with the anchor vertex, another predecessor observable is selected until all of the predecessor observables have been analyzed (block 555). Given that all of the compatible observables are stored in the listing of compatible observables, the temporal correlation operation performs recursive operations for all of the observables within the listing.

Referring now to FIG. 5C, for an $i^{th}$ compatible observable within the listing, where "i" operates as a count value, a determination is made as to what is the corresponding vertex in the selected process template for this compatible observable (blocks 560 and 565). Thereafter, the vertex (i.e. observation state) associated with $i^{th}$ compatible observable is temporarily set as the anchor vertex while the vertex (and observable) is stored as part of the solution associated with the anchor vertex in effect when the $i^{th}$ compatible observable was uncovered (block 570). Thereafter, the analysis set forth in blocks 520-560 as shown in FIGS. 5A-5B for the compatible observable so that any newly uncovered compatible observables are loaded into the listing of compatible observables until all of the compatible observables have been temporarily set as the anchor vertex and analyzed (block 575-579).

Thereafter, a determination is made whether all of the observables for the set of observables have been analyzed as the anchor vertex (block 580). If so, the analysis has completed for the process template and a number of solutions corresponding to the number of observables within the set of observables have been formulated. However, if the determination has not been conducted for all of the observables, the temporal correlation operation returns back to block 505 to select one of the observables that have not yet been selected as an anchor vertex (return loop "D").

Figure 6A:
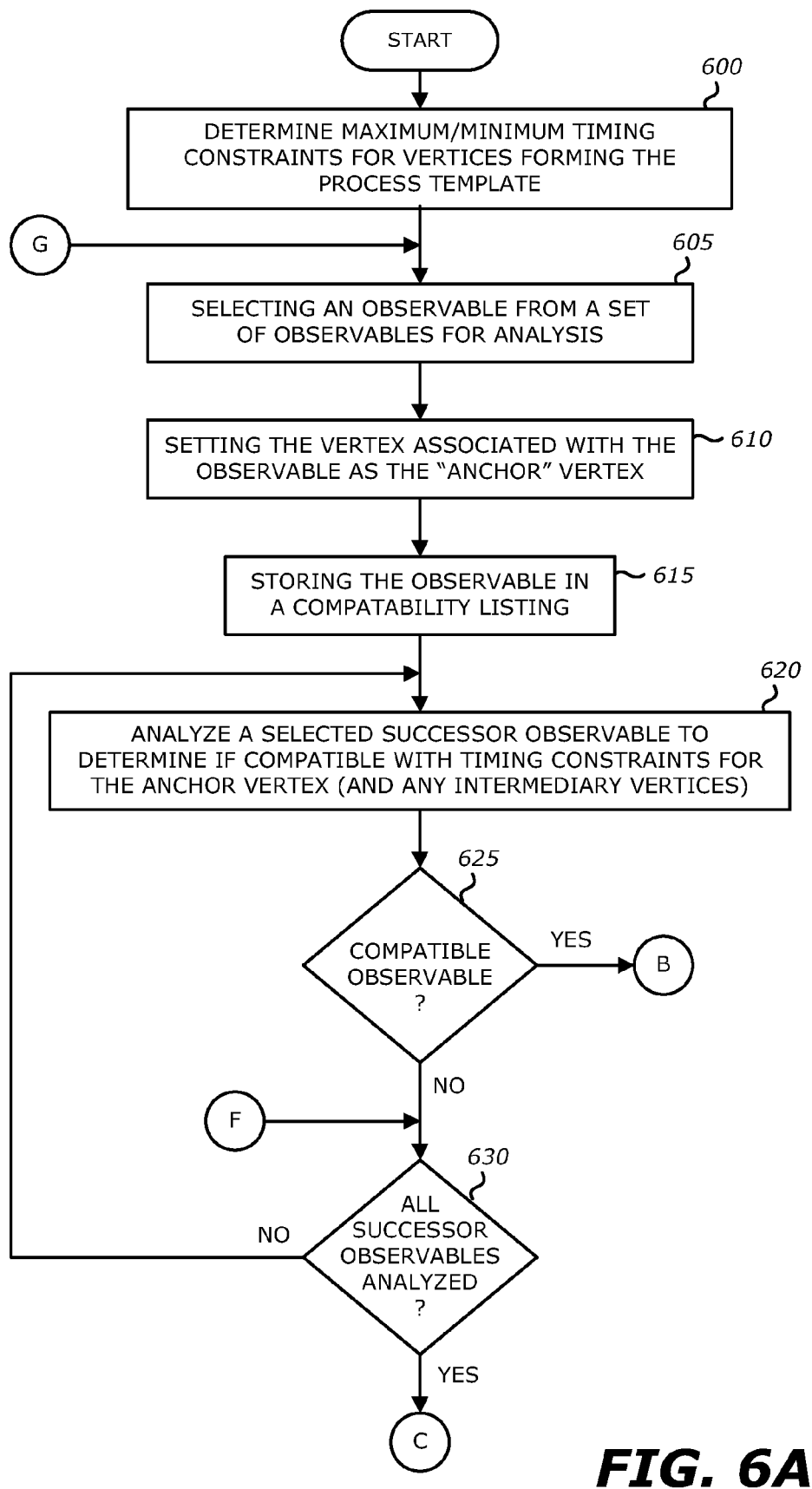
FIGS. 6A-6D is a second illustrative embodiment of the temporal correlation operations performed by temporal correlation logic residing in the electronic device of FIG. 1.

Referring to FIGS. 6A-6D, a second illustrative embodiment of the temporal correlation operations performed by the temporal correlation logic residing in electronic device 110 of FIG. 1 is shown. Initially, as shown in FIG. 6A, minimum and maximum timing constraints for each of the vertices forming the process template are determined (block 600). These timing constraints are used to determine which observables are "compatible" with the observable that is selected to correspond to the anchor vertex.

An observable from a set of observables is selected for analysis (block 605). The selected observable is set to be the "anchor vertex," and the observable is stored in a listing of compatible observables. This listing generally represents the likelihood of the observations identified by the observables representing a monitored process (blocks 610 and 615). Thereafter, a successor observable is selected and analyzed to determine if the successor observable is compatible with the anchor vertex (blocks 620 and 625). If the successor observable is determined to be compatible with the anchor vertex, the temporal correlation scheme begins an iterative analysis as set forth in FIGS. 6B-6C (return loop "B"). However, if the successor observable is determined to be incompatible with the anchor vertex, where applicable, another successor observable is selected and the analysis continues (block 630). If there are no other successor observables left that have not been analyzed already, the temporal correlation scheme begins an analysis of the predecessor observables as set forth in FIG. 6D (return loop "C").

Figure 6B:
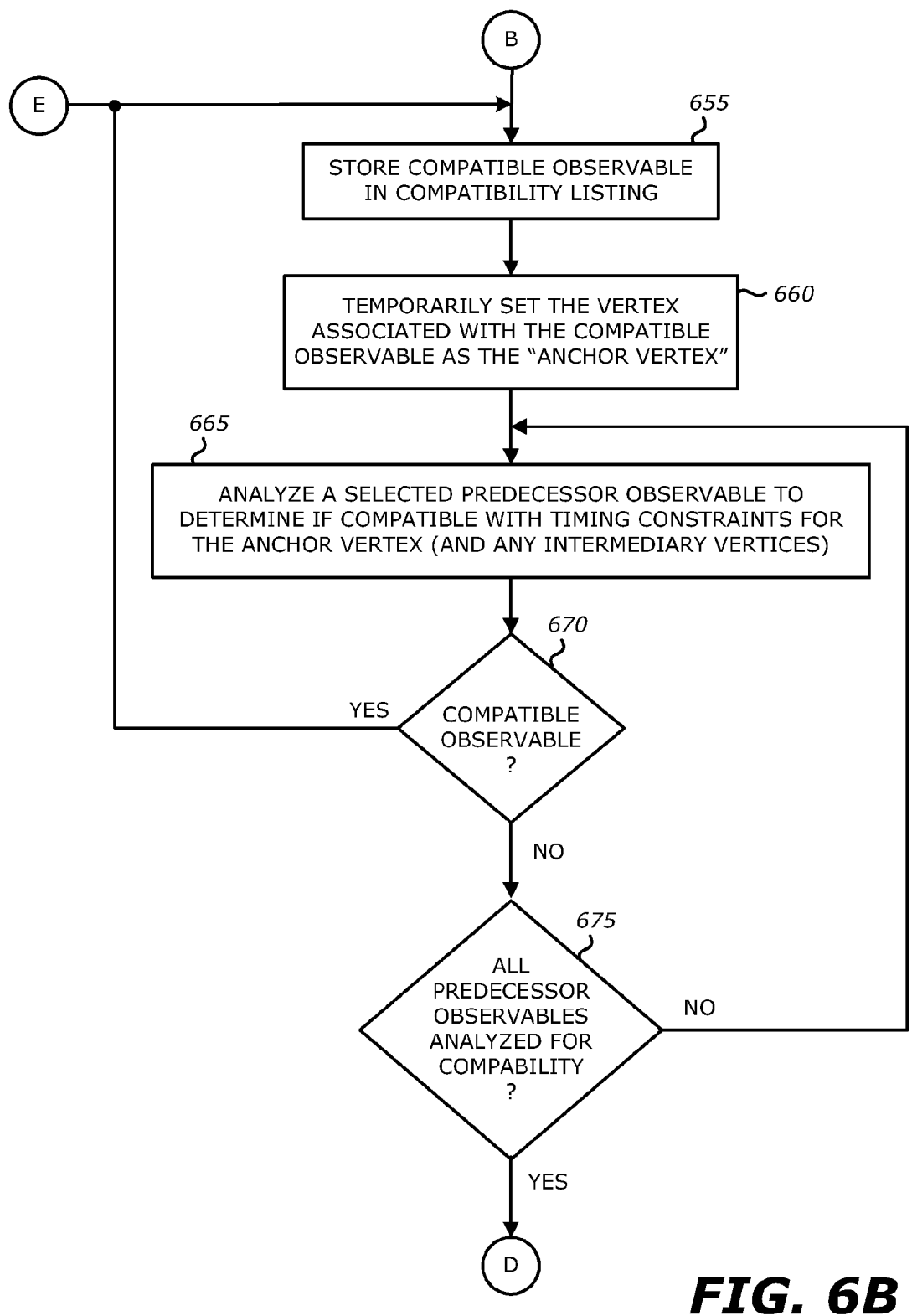
Figure 6C:
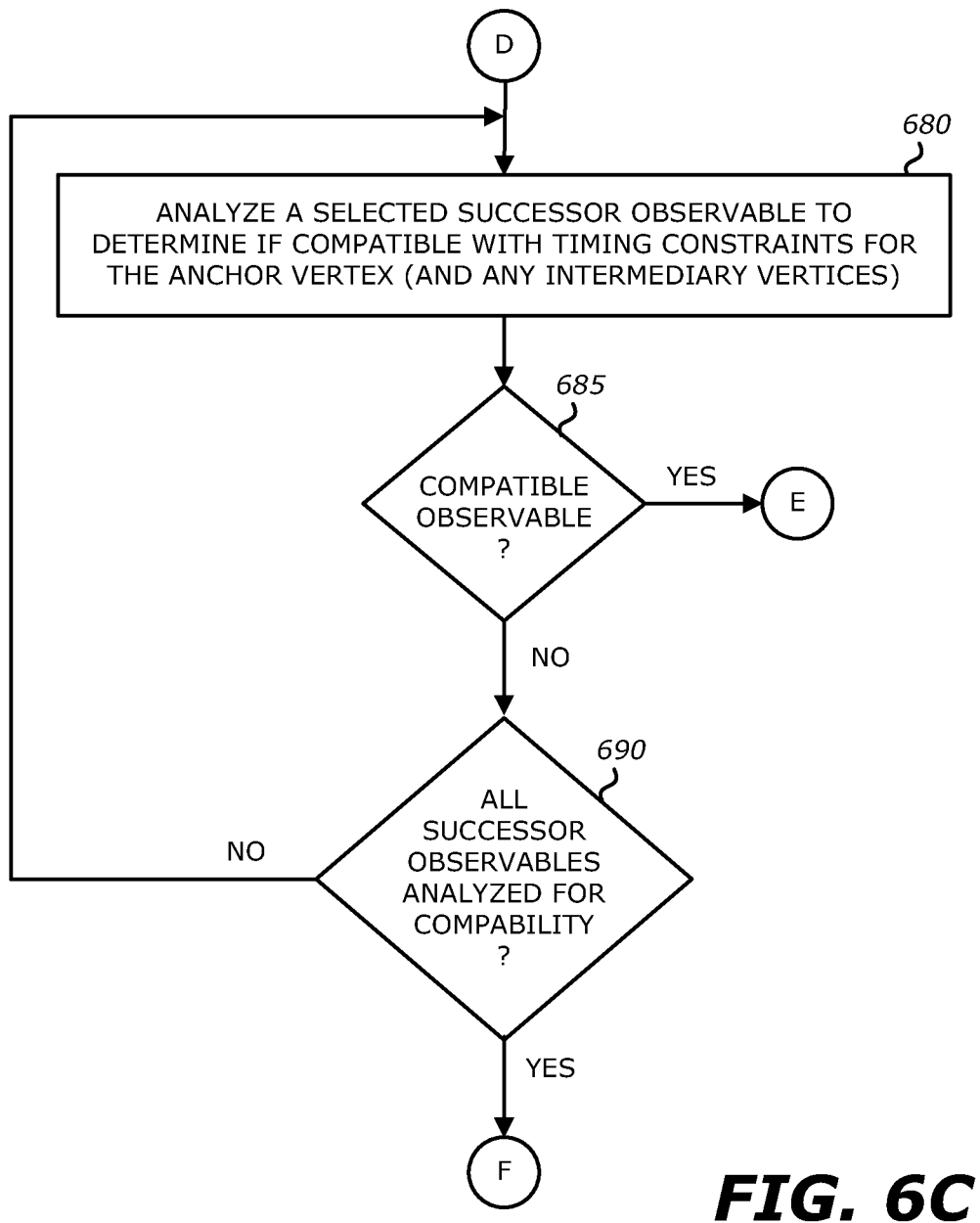
Figure 6D:
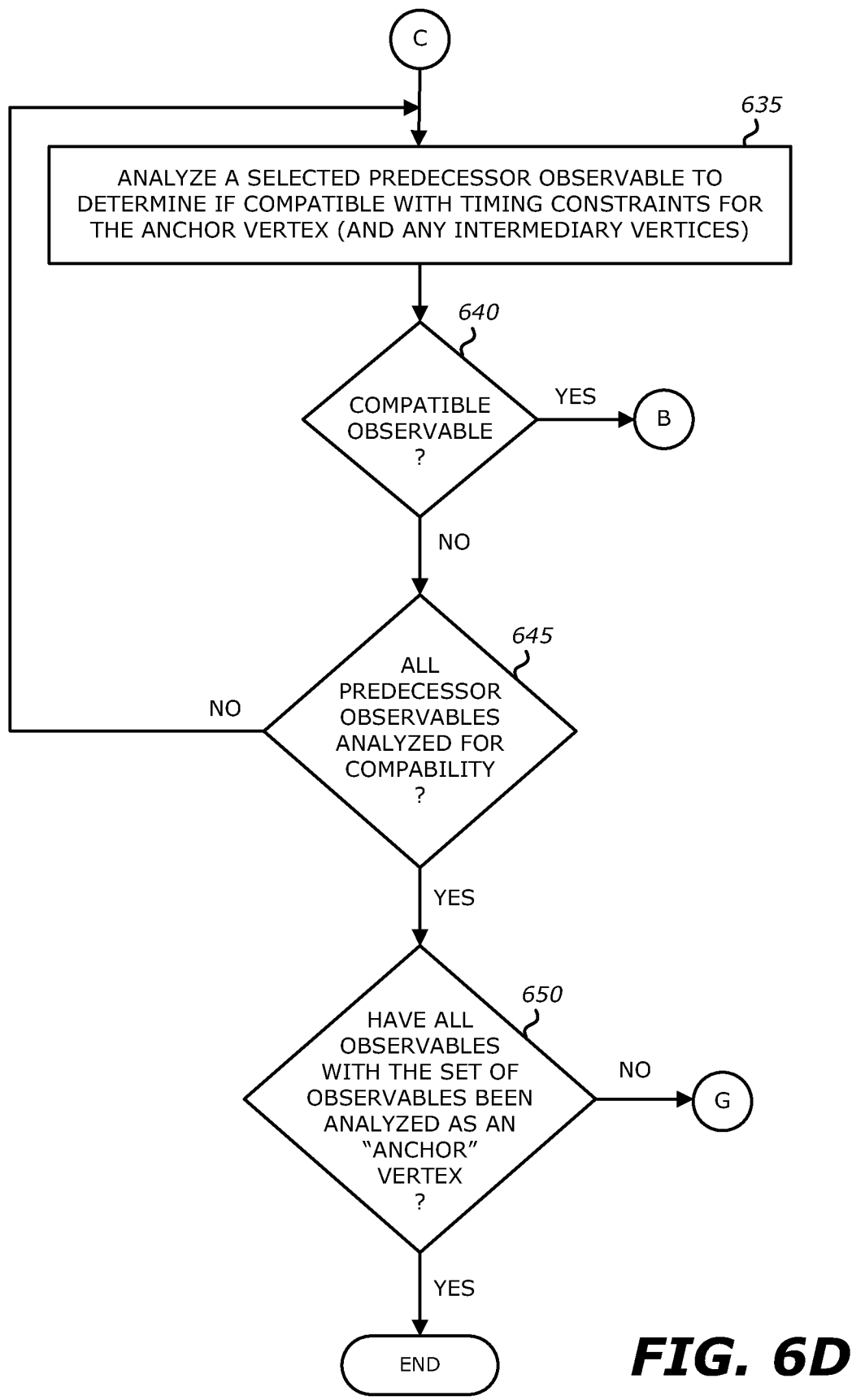

Referring now to FIG. 6D, after the successor observable is determined to be incompatible with the anchor vertex and no other successor observables are left that have not been analyzed already, the temporal correction scheme conducts an analysis of a selected predecessor observable to determine if it is compatible with timing constraints associated with the current anchor vertex (blocks 635 and 640). If the predecessor observable is not compatible with the anchor vertex, another predecessor observable is selected until all of the predecessor observables have been analyzed (block 645). If all of the observables have not been analyzed as temporarily anchor vertices, the temporal correlation operation returns back to select an observable from the set of observables to formulate a new solution using this observable as the anchor vertex (block 650 and return loop "G").

If the predecessor observable is compatible with the anchor vertex, the temporal correlation scheme stores the predecessor observable in the compatibility listing and sets the compatible predecessor observable as a temporary "anchor vertex" as shown in FIGS. 6B and 6D (blocks 640, 655 and 660 along with return loop "B"). Thereafter, a predecessor observable to the temporary anchor vertex is selected and the analysis is conducted to determine if the selected predecessor observable is compatible with timing constraints for the anchor vertex (and any intermediary vertices between the anchor vertex and the observation state associated with the selected predecessor observable (blocks 665 and 670). If the selected predecessor observable is compatible, it is stored within the compatibility listing, the selected predecessor observable is now set as the temporary anchor vertex, and another predecessor observable is selected for analysis (blocks 670, 655 and 660). If the selected predecessor observable is not compatible, a new predecessor observable is selected to determine is compatible with timing constraints for the anchor vertex (and any intermediary vertices) as set forth in block 675.

Where the selected predecessor observable is not compatible and all of the predecessor observables for the temporary anchor vertex have been analyzed, the analysis begins with the successor observables as shown in FIG. 6C (return loop "D"). Herein, a successor observable is selected to determine if it is compatible with timing constraints for the temporary anchor vertex and any intermediary vertices therefrom (blocks 680 and 685). If the selected successor observable is compatible, it is stored within the compatibility listing, set to be the new temporary anchor vertex, and compatibility operations are conducted for predecessor observables of the new temporary anchor vertex (blocks 685, 655, 660, 665 and return loop "E"). The process continues.

However, if the selected successor observable is not compatible, either another successor observable is selected or, if no more successor observables are available, the temporal correlation scheme returns to determine if all of the successor observables have been analyzed for the anchor vertex (block 690 and return loop "F").

Referring now to FIGS. 7A-7B, an exemplary embodiment of a process template 700 for processing successor and predecessor observables and occurrence tables to store information associated with the successor and predecessor observable is shown. First, process template 700 includes a plurality of observation states (vertices) represented as vertex A 710 to vertex H 717. Each of these vertices 710-717 is assigned a timing range represented by a minimum and maximum duration for completion of an activity corresponding to the particular observation state (x-y).

For instance, vertex D is assigned a minimum duration of 3 time units and a maximum duration of seven (7) time units. The time unit may be set to represent any desired unit of time (e.g., a second, minute, hour, day, week, etc.). For illustrated purposes, however, we shall refer the observation times set forth in FIG. 7B as "hour" increments, where 12:00 constitutes noon, 24:00 constitutes midnight, 27:00 constitutes 3:00AM on the next day, etc.

Upon using this unit of time as an example, when observable d2 725 associated with observation state D 713 is selected as the anchor vertex and is observed at time 12:00 hours ($t_a$=12), it is contemplated that the observable d2 725 may have commenced as early as 05:00 hours ($t_a$−7) or may run as late as 19:00 hours ($t_a$+7). This analysis is performed for all successor and predecessor observables using the observable d2 725 as a reference to determine if the successor or predecessor observable is compatible.

According to process template 700 of FIG. 7A and the observables 720 of FIG. 7B, logic within electronic device 110 of FIG. 1 determines whether observable f1 730 corresponding to vertex F 715 was observed within its allocated timing ranging between 12:00 hours ($t_a$=12 occurring immediately after detection of observable d2) and 20:00 hours ($t_a$+8 =20:00). Since observable f1 730 was observed at 14:00 hours, it is compatible with anchor vertex D 713 and observable d2 725. Similarly, logic within electronic device 110 of FIG. 1 determines whether observable f2 735 corresponding to vertex F 715 was observed within its allocated timing ranging between 12:00 hours ($t_a$=12 occurring immediately after detection of observable d2) and the latest time value 27:00 hours ($t_a$+7 (max time to complete observable d2)+8 (max time to complete an activity associated with observable state F)=27:00). Since observable f2 735 was observed at 26:00 hours, it is compatible with anchor vertex D 713 and observable d2 725.

Further in the analysis of observables 720 of FIG. 7B, logic within electronic device 110 of FIG. 1 determines whether observable g2 740 corresponding to vertex G 716 was observed within its allocated timing ranging between 14:00 hours (immediately after detection of observable d2) and 21:00 hours ($t_a+7+2=21:00$). Since observable g2 740 was observed at 16:00 hours, it is compatible with anchor vertex D 713 and observable d2 725.

However, observables e1 745, a2 750, e2 755, and b1 760 are associated with observables that occur later in time than observable d2 but are associated with observation states that occur prior to anchor vertex D 713. Thus, these observables are not compatible with anchor vertex D 713 and observable d2 725. Observable d3 765 constitutes an activity of the same type as the activity associated with observable d2 725, and thus this observable is not considered compatible when anchor vertex D 713 is used.

After this temporal correlation analysis has been conducted for the successor observables, the same analysis is conducted for the predecessor observables. For instance, according to process template 700 of FIG. 7A and the observables 720 of FIG. 7B, logic within electronic device 110 of FIG. 1 determines whether observable a1 770 corresponding to vertex A 710 was observed within its allocated timing ranging between 1:00 hours ($t_{max}$=12:00 (at d2)−6 (max time at vertex B)−5 (max time at vertex A)=1:00) where observation at end of the activity associated with observable a1) and 10:00 hours ($t_{min}$=12:00 (at d2)−2 (min time at vertex B)=10:00). Since observable a1 745 was observed at 06:00 hours, it is compatible with anchor vertex D 713 and observable d2 725.

Similarly, logic within electronic device 110 of FIG. 1 determines whether observable c1 775 corresponding to vertex C 712 was observed within its allocated timing. This can be computed by determining that observable d2 was observed at 12:00 so that observables associated with vertex E 714 commence observation as late as 2:00. Since observable c1 associated with vertex C 712 is noted to be observed at the start time of observables associated with vertex E 714, and thus, observable c1 is considered to be incompatible with anchor vertex D 713 and observable d2 725.

Logic within electronic device 110 of FIG. 1 also determines whether observable g1 780 corresponding to vertex G 716 was observed within its allocated timing. This can be computed by determining that observable d2 was observed at 12:00 so that observables associated with vertex G 716 commence observation early as 12:00 (i.e. observable d2 observed at completion). Thus, observable g1 780 is considered to be compatible with anchor vertex D 713 and observable d2 725. Using similar analysis, observables h1 785 and h2 790 are found to be not compatible with anchor vertex D 713 and observable d2 725. Observable d1 795 constitutes an activity of the same type as the activity associated with observable d2 725, and thus this observable is not considered compatible when anchor vertex D 713 is used.

FIGS. 7C-7Q illustrate computed solutions for a data set of the observables listed in an occurrence table of FIG. 7B, where a summary of the findings using observable d2 725 as the anchor vertex is shown in FIG. 7H. Herein, each observable is set as the anchor vertex and processing is performed to determine compatible observables, namely successor and predecessor observables that are computed to match temporally within a monitored process. Herein, for instance, the solution where observable a1 is set as the anchor vertex determines that there are six temporally matching observables, and of these observables, they belong to four (4) different observation states (i.e. vertices). Since the process template features eight (8) observation states (vertices), the matching suggests a better likelihood that the observables suggest that an event of interest associated with monitored process has occurred more than those observables surrounding observation a2, where only two (2) observables a2 and d1 are compatible.

Having disclosed exemplary embodiments and the best mode, modifications and variations may be made to the disclosed embodiments while remaining within the scope of the embodiments of the invention as defined by the following claims.

What is claimed is:

1. An electronic device comprising:
    a memory to store information representing a process template for an event, the process template including a series of observation states, an observation state including one or more observables; and
    a processor coupled to the memory, the processor to receive a plurality of observables and to determine a compatibility of a selected observable with a reference observable by comparing a time the selected observable was observed with an allocated time frame for the selected observable in relation to the time the reference observable was observed, the allocated time frame for the selected observable being a time spanning (i) the time the reference observable was observed minus a maximum time duration of the reference observable minus a maximum time duration of the selected observable to (ii) the time the reference observable was observed plus a maximum time duration of the reference observable plus a maximum time duration of the selected observable.

2. The electronic device of claim 1, wherein the processor determines the compatibility of each of the plurality of observables with the reference observable operating as an anchor vertex.

3. The electronic device of claim 2, wherein the processor recursively determines the compatibility of each of the plurality of observables with the each of the plurality of observables being analyzed as the anchor vertex.

4. The electronic device of claim 1, wherein the selected observable appears subsequent to the reference observable in the process template and the allocated time frame for the selected observable is a time spanning (i) the time the reference observable was observed to (ii) the time the reference observable was observed plus a maximum time duration of the reference observable plus a maximum time duration of the selected observable.

5. The electronic device of claim 1, wherein the selected observable appears prior to the reference observable in the process template and the allocated time frame for the selected observable is a time spanning (i) a time the reference observable was observed minus a maximum time duration of the reference observable minus a maximum time duration of the selected observable to (ii) the time the reference observable was observed.

6. An electronic device comprising:
    a memory to store information representing a process template for an event, the process template including a series of observation states, each observation state including one or more observables; and
    a processor coupled to the memory, the processor to receive a plurality of observables and to determine a compatibility of a selected observable with a reference observable by comparing a time the selected observable was observed with an allocated time frame for the selected observable in relation to a time the reference observable was observed, the allocated time frame for the selected observable being a time spanning (i) a first predetermined period of time prior to the time the reference observable was observed to (ii) a second predetermined period of time after the time the reference observable was observed, wherein the first predetermined period of time comprises the time the reference observable was observed adjustable previously in time by a maximum time duration of the reference observable and a maximum time duration of the selected observable, and the second predetermined period of time comprises the time the reference observable was observed adjusted forward in time by the maximum time duration of the reference observable and the maximum time duration of the selected observable.

7. The electronic device of claim 6, wherein the processor determines the compatibility of each of the plurality of observables with the reference observable operating as an anchor vertex.

8. The electronic device of claim 7, wherein the processor recursively determines the compatibility of each of the plurality of observables with the each of the plurality of observables being analyzed as the anchor vertex.

9. An electronic device comprising:
a memory to store information representing a process template for an event, the process template including a series of observation states, each observation state including one or more observables; and
a processor coupled to the memory, the processor to receive a plurality of observables and to determine a compatibility of a selected observable with a reference observable by comparing a time the selected observable was observed with an allocated time frame for the selected observable in relation to a time the reference observable was observed, the allocated time frame for the selected observable being a time spanning (i) a first predetermined period of time prior to the time the reference observable was observed to (ii) a second predetermined period of time after the time the reference observable was observed, wherein the first predetermined period of time comprises the time the reference observable was observed adjustable previously in time by a first time duration associated with the reference observable and a second time duration associated with the selected observable, and the second predetermined period of time comprises the time the reference observable was observed adjusted forward in time by a third time duration associated with the reference observable and a fourth time duration associated with the selected observable.

10. The electronic device of claim 9, wherein the first predetermined period of time comprises the time the reference observable was observed adjustable previously in time by the first time duration being a maximum time duration of the reference observable and the second time duration being a maximum time duration of the selected observable.

11. The electronic device of claim 10, wherein the second predetermined period of time comprises the time the reference observable was observed adjusted forward in time by the third time duration being the maximum time duration of the reference observable and the fourth time duration being the maximum time duration of the selected observable.

12. The electronic device of claim 9, wherein the second predetermined period of time comprises the time the reference observable was observed adjusted forward in time by the third time duration being a maximum time duration of the reference observable and the fourth time duration being a maximum time duration of the selected observable.

13. The electronic device of claim 9, wherein the processor determines the compatibility of each of the plurality of observables with the reference observable operating as an anchor vertex.

14. The electronic device of claim 13, wherein the processor recursively determines the compatibility of each of the plurality of observables with the each of the plurality of observables being analyzed as the anchor vertex.

15. The electronic device of claim 9, wherein the first predetermined period of time is equal to the second predetermined period of time.

\* \* \* \* \*